INVENTOR
D. L. McKAY

United States Patent Office 3,487,652
Patented Jan. 6, 1970

3,487,652
CRYSTAL SEPARATION AND PURIFICATION
Dwight L. McKay, Bartlesville, Okla., assignor to Phillips Petroleum Company, a corporation of Delaware
Filed Aug. 22, 1966, Ser. No. 574,076
Int. Cl. B01d 9/02
U.S. Cl. 62—58                                11 Claims

ABSTRACT OF THE DISCLOSURE

Process for separating a component of a feed mixture as a filter cake layer of crystals of the component on the outer surface of a rotary vacuum filtering means, which filter cake layer tends to form cracks and openings therein permitting by-passing of fluid through the filter cake layer, comprising spraying a slurry containing crystals of the component onto the surface of the filter cake layer to fill and seal the said cracks and openings, and applying suction to the inner surface of the filter cake to remove liquid components therefrom.

---

This invention relates to the separation of components of liquid multicomponent mixtures by fractional crystallization. In another aspect, this invention relates to an improved process of and apparatus for filtration.

In the separation of components of liquid multicomponent mixtures by crystallization methods, it is theoretically possible in many cases to obtain at least one of the components in substantially pure form in a single stage operation. Accordingly, while distillation and solvent extraction methods of separation in theory would require infinite stages for a pure product, only one stage of crystallization should be required for a system forming eutectic-type phase behavior since crystals separating from such a solution are presumed to be pure. However, in actual practice, it has been found that the crystals obtained from a solution of several components are impure because of the occlusion of mother liquid within the crystal interstices.

The amount of mother liquor occluded or entrapped by the crystals formed is ordinarily so great that it is necessary to provide some method for the removal of the occluded impurities if a high purity product is to be obtained in a single crystallization stage. This separation of mother liquor from crystals is normally done by the use of a vacuum filter whereby cake drying gases and wash liquids are pulled through a filter cake. However, problems many times arise when the filter cake develops cracks and openings because these cracks and openings become easy routes whereby cake drying gases, vapors, and wash liquids by-pass the crystals which contain the occluded mother liquor. Thus, it becomes necessary to devise a way to fill these cracks and openings so that the drying gases and mother liquor will be uniformly pulled through the filter cake.

One object of this invention is to provide an improved process for the separation and purification of a component of a liquid multicomponent mixture. Another object of this invention is to provide a crystal separation process wherein substantially all of the occluded impurities are removed from the crystals so as to obtain a high purity product. A further object of this invention is to provide an improved filtration apparatus for crystal separation from liquid mixtures. Other objects and advantages will become apparent to those skilled in the art from the following description and disclosure.

According to one aspect of the invention, at least one component is separated from a liquid multicomponent mixture by first partially freezing the said mixture and forming a first crystal slurry comprising crystals of at least one of the components of the said mixture, and mother liquor. One portion of the first crystal slurry is used to coat a filtering medium in a vacuum filter device with a layer of crystals. A second portion of the first crystal slurry is then sprayed onto the surface of the coated filter medium to fill any openings or cracks in the crystal layer with crystals from said second portion of said first crystal slurry. A vacuum is then pulled across the crystal layer to pull cake drying gases and occluded mother liquid therethrough. The resulting crystal layer is then sprayed with a second slurry solution formed by partially melting the solid filter cake from the vacuum filter device. This second slurry has a very high content of the component or components to be separated, and tends to freeze or glace on the surface of the filter cake and thereby seal the cake pores so that mother liquor is drawn from the cake by the influence of the filter vacuum. The crystals in the second slurry also serve to quickly fill any opening in the filter cake which would permit by-pass of the liquid in the second slurry before it can freeze.

According to another aspect of this invention, crystal content of either or both of the slurry streams can be adjusted by first passing the slurry stream or streams through a controlled heat exchanger before they are applied to the crystal layer on the filter medium. For example, the first crystal slurry can be first warmed slightly to melt most of the very small crystals and then cooled to encourage growth of the remaining crystals. In this manner, larger crystals can be formed to fill the openings in the crystal cake.

According to another aspect of this invention, mother liquor from the vacuum filter device is used to precool the feed mixture to the feed chiller and to cool the drying gas to the vacuum filter device. In this manner, energy required for the cooling operation is minimized.

A more complete understanding of the invention may be obtained by reference to the following description and the accompanying drawing, to which:

Figure 1:
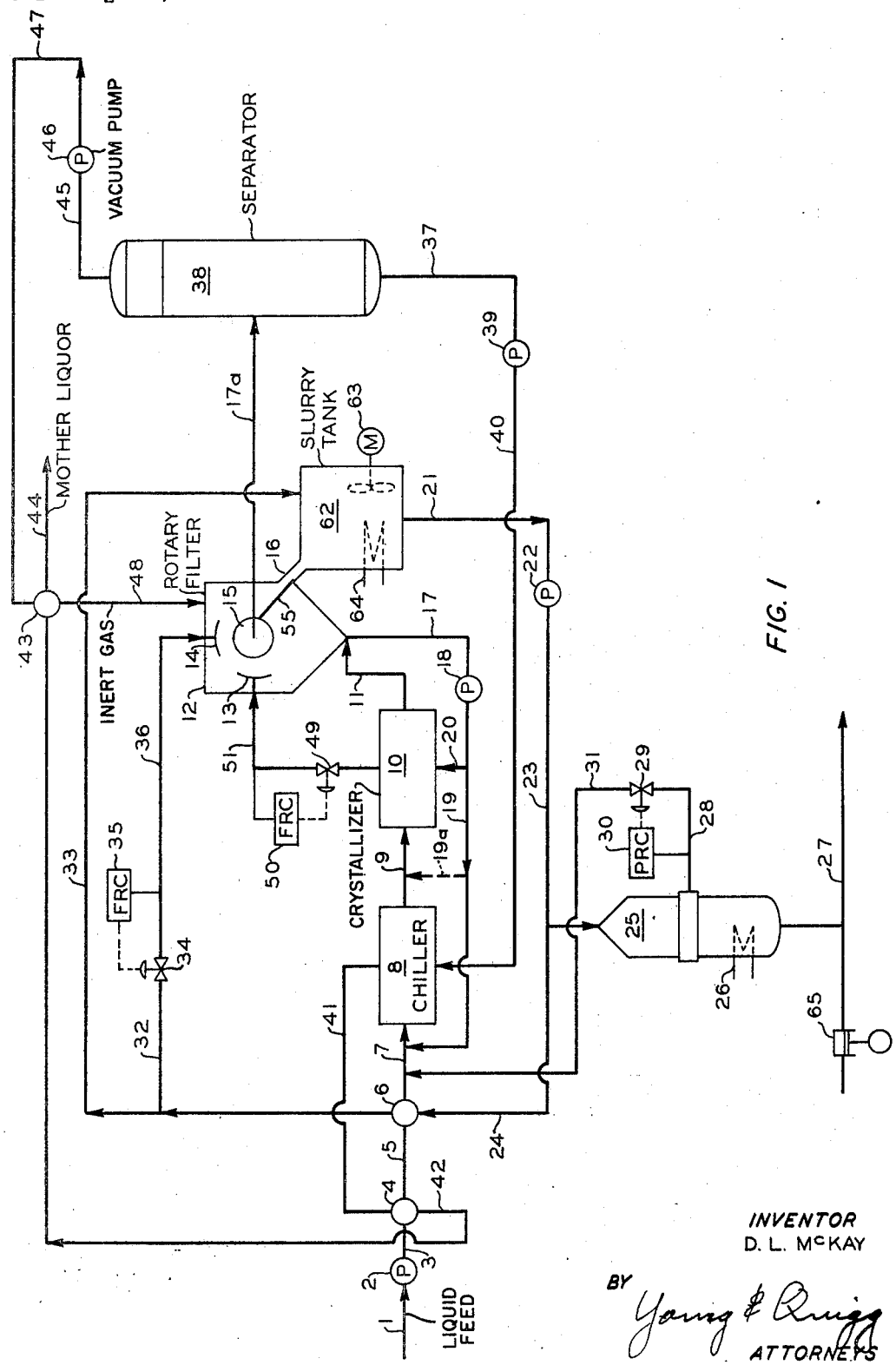
FIGURE 1 is a schematic illustration of an arrangement of apparatus suitable for practicing the process of this invention.

Referring now to FIGURE 1, the feed mixture enters conduit 1 and flows through conduit 3, precooler 4, conduit 5, precooler 6, conduit 7, precooler 8, conduit 9, and to chiller 10. Chiller 10 can be any conventional type chiller, preferably being of the scraped surface type, which is supplied with refrigeration means that are adequate to lower the temperature of the liquid mixture to that necessary to crystallize at least a major portion of at least one of the components thereof to form a first crystal slurry. The resulting first slurry then passes to the lower portion of rotary drum filter 12 via conduit 11, and a portion thereof is recycled to conduit 7 via conduit 17, pump 18 and conduit 19 or to conduit 9 via conduit 19a. A portion of the recycle flowing through conduit 19 is withdrawn via conduit 20 in response to valve 49 which is controlled by flow controller 50 positioned in conduit 51. The amount of slurry passing through conduit 51 is then applied to rotary drum 15 by spray applicator 13. A vacuum is applied to rotary drum 15 by vacuum pump 46 via conduit 45, separation vessel 38, and conduit 17a. An inert gas such as nitrogen or helium is contained within the upper portion of separation vessel 38, conduits 45, 47, 48, and in the enclosure surrounding rotary drum 15 of rotary drum filter 12. This inert gas is necessary to prevent any side reactions within rotary drum filter 12 that might occur when an oxygen-containing gas such as air is used in the system as the drying gas. Mother liquor that is carried over with the inert gas via conduit 17a is collected in the bottom of collection vessel 38, and is removed via conduit 37, pump 39, and conduit 40 and introduced into precooler 8 wherein it extracts heat from the feed mixture flowing from conduit 7. Mother liquor is then passed to feed precooler 4 via conduit 41 wherein it further extracts heat from feed mixture flowing through conduit 3. The mother liquor then passes through heat exchanger 43 via conduit 42 wherein it extracts heat from the inert gas flowing through conduit 47 to rotary drum filter 12 via conduit 48. The mother liquor is finally drawn from heat exchanger 43 via conduit 44. The crystals are removed from rotary drum 15 by a doctor blade 55 and passed to slurry tank 62 via conduit 16 wherein they are heated if necessary by heating element 64 and mixed by mixer 63 to form a second crystal slurry. The second slurry solution is then removed from slurry tank 62 via conduit 21, pump 22, and conduit 23. The stream flowing through conduit 23 is split into two portions in conduit 24. A first portion flows through precooler 6 wherein it extracts feed from a heat mixture flowing from conduit 5, thereby becoming warmer, and then flows through conduit 33 back to slurry tank 62 to melt additional crystal slurry cake from filter 15. A portion of the slurry is withdrawn from conduit 33 via conduit 32 as controlled by valve 34 which in turn is manipulated by a flow recorder controller 35. The slurry flowing through conduit 36 is applied on rotary drum 15 by spray applicator 14. The detailed operation of rotary drum filter 12 will be discussed later in connection with the discussion of FIGURE 3. A second portion of the second slurry withdrawn from conduit 23 and flowing to conduit 24 is introduced into purification column 25. The crystals from the said second slurry are moved through purification column 25 as a compact mass by the action of pulse pump 65—the column is more adequately described in U.S. Patent 2,854,494. Heater 26 melts a portion of the said crystals of the mass in the lower portion of column 25, and the resulting melt is refluxed to the crystal mass where it displaces occluded impurities therefrom. The melt product is removed from purification column 25 via conduit 27, and displaced mother liquor is withdrawn from column 25 via conduit 28 in response to the opening of valve 29 which is manipulated by pressure controller 30, and then introduced into conduit 7 via conduit 31.

Figure 2:
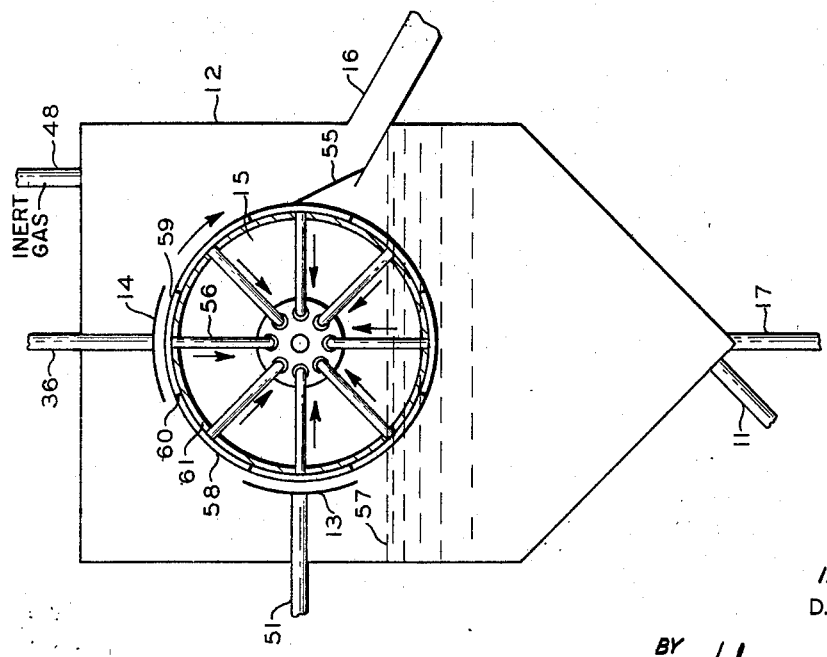
FIGURE 2 is a cross-sectional view of the improved rotary filter of this invention.

The operation of the rotary drum filter 12 of this invention is illustrated by FIGURE 2. The exterior surface of drum 15 is divided by a number of longitudinal segments by means of raised strips 60 placed in parallel to the axis of the drum. Filter medium 58, which may be either cloth or wire screening, is wrapped around the drum, covering its outer surface and dividing strips 60, and is held in place by means of a wrapping of wire or metal bands. At least one suction pipe 56 communicates with each of the spaces 59 defined by drum surface 61, strips 60 and filter medium 58, each pipe being connected to a means, not shown, for creating a vacuum beneath the filter medium. Cylindrical drum 15 is rotated by means of gears and a motor, not shown. The lower portion of rotary drum 12 is a tank for holding the first slurry which passes from chiller 10 via conduit 11. The level of the slurry within the tank is shown by line 57. Chiller recycle is removed from the rotary drum tank via conduit 17. An inert gas such as nitrogen or helium enters rotary drum filter enclosure 12 via conduit 48 and surrounds the unsubmerged portion of rotary drum 15. Rotary drum 15 is partially submerged as shown and turns in the direction as indicated. While submerged a vacuum is applied through conduits 56 and mother liquor flows therethrough leaving crystals adhering to filter medium 58. However, this crystal cake is usually uneven and contains many openings; consequently, when the drum is rotated to the gas filled portion of the rotary filter, the gas will flow through these cracks and openings, and reduce the pressure drop across the filter cake whereby the liquid cannot be removed from the crystal layer. Crystal slurry from conduit 51 is then applied through the crystal surface on the drum by spray applicator 13. The crystals contained within the crystal slurry fill any voids and openings in the crystal cake to thereby allow the vacuum to pull the occluded liquid from the crystals into the interior of the filter. As the drum rotates it is treated further with a second slurry solution from slurry tank 62 which flows through conduit 36 and is applied to the exterior surface of the drum by spray applicator 14. The liquid phase of the second slurry contains a high concentration of the crystallizable component or components, and tends to freeze or glace on the crystal surface. The crystals contained within the second slurry fill any existing voids and prevent the liquid phase from flowing through the crystal bed before it freezes. At this point, a very even and frozen crystal bed is contained on filter medium 58, and vacuum applied via conduits 56 will remove most of the remaining liquid to yield a high-purity product. The crystal bed or cake is then removed from filter medium 58 by doctor blade 55, and flows through conduit 16 to slurry tank 62. This invention can be practiced without the necessity of spraying the second slurry solution on drum 15, because in many operations the application of the first slurry is sufficient to fill existing voids and maintain the proper pressure differential through the crystal cake.

Figure 3:
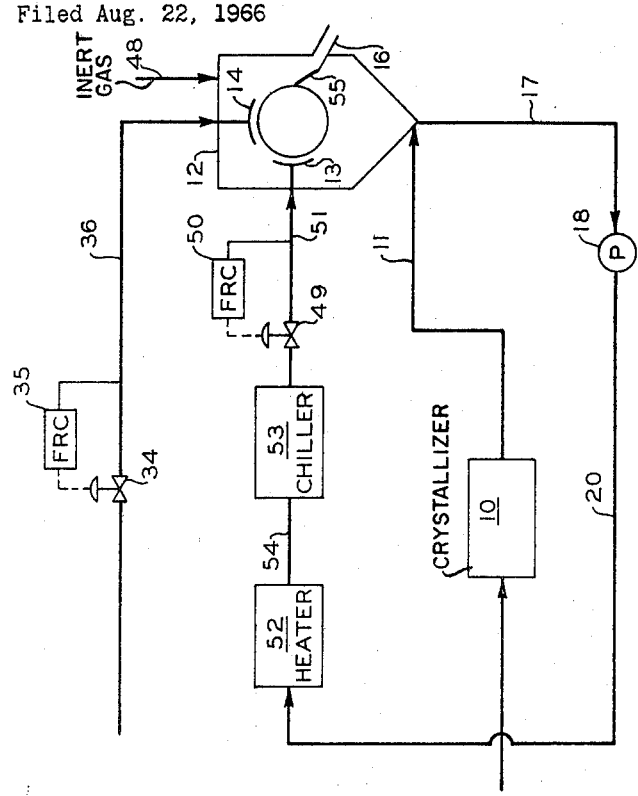
FIGURE 3 is a schematic illustration showing another embodiment of this invention.

Another embodiment of this invention is illustrated by FIGURE 3. The crystal content of the first slurry flowing through conduit 51 to spray applicator 13, or the second slurry flowing through conduit 36 to spray applicator 14 can be adjusted to maintain optimum crystal content and/or optimum crystal size. FIGURE 3 illustrates only one application of this embodiment wherein it is necessary to fill rather large gaps in the crystal layer on filter medium 58. Thus, slurry is withdrawn from the bottom of rotary drum filter 12 via conduit 17, pump 18 and conduit 20 and introduced into heater 52 wherein it is warmed slightly to melt most of the very small crystals. The slurry is then passed to chiller 53 via conduit 54 wherein it is further cooled to encourage growth of the remaining crystals. Resultant solution is then sprayed on drum 15 by spray applicator 13. In this manner, larger crystals can be formed to fill the larger gaps in the crystal cake on drum 15. It may be desirable to only heat the crystal slurry at times, thus by-passing chiller 53. Or it may sometimes be desirable to only chill the slurry, thus by-passing heater 52.

I claim:

1. A process for the separation and purification of at least one of the components of a liquid mixture which comprises:
   (a) passing the said mixture to a cooling zone wherein at least one of the components is frozen to form a first crystal slurry;
   (b) passing a first portion of the said first crystal slurry to a vacuum filter zone wherein the crystals are separated in the form of crystal filter cake from the liquid, and passing a second portion of the said first crystal slurry to a first slurry applicator whereby the said second portion of said first crystal slurry is applied to the crystal filter cake formed in the said vacuum filter zone;
   (c) removing the thus treated crystal filter cake from said vacuum filter zone and passing the thus removed crystal filter cake to a heating and mixing zone wherein it is at least partially melted to form a second crystal slurry;
   (d) passing a first portion of said second crystal slurry to a second slurry applicator whereby the said first portion of said second crystal slurry is applied to the crystal filter cake in the said vacuum filter zone after the said second portion of said first crystal slurry is applied thereto by the said first slurry applicator, and recycling a second portion of the said second crystal slurry to said heating and mixing zone;
   (e) passing a third portion of said second crystal slurry to a crystal purification zone, passing the crystals from the said third portion of said second slurry through the said crystal purification zone as a compact mass, melting a portion of said crystals in said compact mass in the downstream portion of said crystal purification zone, contacting the said crystals in said compact mass with the melted portion in the said downstream portion of the crystal purification zone and thereby displacing impurities therefrom, removing liquid displaced from said compact mass, and removing a purified product from the downstream portion of said crystal purification zone.

2. The method of claim 1 wherein crystal content in the said first and second crystal slurries flowing through said first and second slurry applicators is controlled by passing the said first and second crystal slurries through heating and cooling zones.

3. The method of claim 1 wherein crystal content of the said first portion of the said first crystal slurry is adjusted by first heating the first portion of the first crystal slurry to melt the smaller crystals and then cooling to form resulting larger crystals.

4. The process of claim 1 wherein said liquid from said crystal purification zone is passed to the feed mixture entering the said cooling zone.

5. The method of claim 1 wherein the said vacuum filter zone is a rotary drum filter having an inert gas contained around the unsubmerged portion thereof, and the liquid from said rotary drum filter is passed through heat exchange zones for precooling the feed mixture and the inert gas.

6. The method of claim 5 wherein said inert gas is nitrogen.

7. A process for separating a component from a liquid multi-component feed mixture which contains crystals of said component, which comprises:
(a) contacting the outer surface of a rotary vacuum filtering means which said mixture so that said surface is coated with a filter cake layer of said crystals, which layer is subject to the formation of cracks and openings which would permit at least a partial bypass flow of fluid therethrough and reduce the pressure drop across the crystal filter cake layer;
(b) spraying said layer of crystals with a first sealing slurry comprising said liquid multi-component mixture containing a substantial amount of crystals of said one component, said crystals of said component contained in said first sealing slurry forming a layer on the surface thereby filling the cracks and openings in said filter cake layer of crystals;
(c) applying suction to the inner surface of said filter caye layer of crystals to thereby remove liquid components therefrom.

8. The process of claim 7 wherein the said layer of crystals is sprayed with a second slurry comprising a portion of the partially melted crystal filter cake from said filtering means, said second slurry thereby freezing and forming a glace layer on the surface of said layer of crystals, and removing the said crystal filter cake from said filtering means as substantially pure product.

9. The method of claim 8 wherein said outer surface of said filtering means is the outer surface of a rotary drum of a rotary filter.

10. A process for separating a component from a liquid multi-component feed mixture which comprises:
(a) cooling said mixture to crystallize one of said components, thereby forming a partially crystallized slurry containing a substantial amount of crystals of said one of said components;
(b) contacting the outer surface of a filtering means with the said partially crystallized slurry so that such surface is coated with a layer of crystals from said slurry, forming a filter cake which is subject to the formation of cracks and openings which would permit at least a partial bypass therethrough;
(c) maintaining the pressure on the inner surface of said filter cake at a pressure below that of the outer surface in order to remove liquid components from said filter cake;
(d) spraying a first sealing slurry comprising a portion of said partially crystallized slurry containing a substantial amount of crystals of said one of said components onto the surface of said filter cake in order to seal the surface of said filter cake; and
(e) removing at least a portion of said filter cake from said filtering surface as a crystal product.

11. The process of claim 10 further comprising spraying a second sealing slurry which comprises a partially melted portion of said crystal product onto the outer surface of said filter cake on said filtering means in order to further seal the surface of said filter cake from said filtering means.

References Cited

UNITED STATES PATENTS

| | | | |
|---|---|---|---|
| 2,670,083 | 2/1954 | McKay | 62—58 X |
| 2,781,294 | 2/1957 | McKay | 62—58 X |
| 2,815,288 | 12/1957 | McKay | 99—205 |
| 2,854,494 | 9/1958 | Thomas | 260—674 |
| 2,881,230 | 4/1959 | Buell | 260—674 |
| 2,885,431 | 5/1959 | Tarr | 62—58 X |
| 2,904,412 | 9/1959 | McBride et al. | 23—302 |
| 2,945,903 | 7/1960 | Findlay | 260—674 |
| 2,979,453 | 4/1961 | Kiersted et al. | 62—58 X |
| 3,050,953 | 8/1962 | Wilson | 62—58 |
| 3,102,908 | 9/1963 | Raynes | 260—537 |

FOREIGN PATENTS 686,783  5/1964  Canada.

NORMAN YUDKOFF, Primary Examiner

F. E. DRUMMOND, Assistant Examiner

U.S. Cl. X.R.

23—295; 49—205; 260—674